United States Patent Office 3,129,243
Patented Apr. 14, 1964

3,129,243
PROCESS FOR THE PREPARATION OF SUBSTITUTED BENZENIC COMPOUNDS FROM ACETYLENES
Karl Walter Hübel, Brussels, Belgium, assignor to Union Carbide Corporation, a corporation of New York
No Drawing. Filed May 13, 1958, Ser. No. 734,832
Claims priority, application Great Britain May 16, 1957
11 Claims. (Cl. 260—475)

The present invention relates to improvements in the preparation of cyclic compounds. More particularly, it relates to improvements in the preparation of substituted aromatic compounds by cyclization of acetylenic derivatives.

It is known that W. Reppe and W. J. Schweckendiek have reported, in Annalean 560 (1948) p. 104, the preparation of benzene from acetylene and the mixtures of 1.3.5 and 1.2.4. trihydroxymethyl benzene from propargyl alcohol by using a special nickel acetylide catalyst. This catalyst was preliminarily prepared by reacting a triphenyl phosphino nickel carbonyl or a dibromodi (triphenyl phosphino) nickel compound with acetylene under pressure (e.g. 10 to 15 atm.) for a certain period. The authors have found that their catalyst was only active for the trimerization of acetylene and mono-substituted acetylene.

More recently, J. D. Rose and F. S. Statham (Journal Chem. Soc., London, 1950, p. 69) have attempted the trimerization of a series of acetylenic compounds by using the same catalyst. Only two novel trimerizations were successfully achieved, namely that one of phenylethynyl carbinol into 1.3.5. tri(α-hydroxybenzyl)benzene and of phenyl acetylene into 1.2.4. triphenylbenzene. As in the previous case, no trimerization of a disubstituted acetylene coul be achieved.

The object of the present invention is to overcome the difficulties of the related and foregoing prior art. Another object is to provide a process for the preparation of symmetric and asymmetric substituted aromatic compounds by cyclization of mono- and disubstituted acetylenic compounds. A still further object is to provide a process for the preparation of a series of partially and completely substituted aromatic compounds by cyclization of a plurality of acetylenic compounds as a mixture. Another object is to provide novel and useful symmetric and asymmetric substituted benzenic compounds which can further be used as starting material in the synthesis of aromatic compounds. Other objects of the invention will appear from the description which follows.

The present invention is based upon the discovery that disubstituted acetylenic compounds undergo a one-step trimerization into substituted benzenic compounds, by the opening of the acetylenic bond, when the reaction is performed at elevated temperature in presence of certain compounds, such as for example metal carbonyls described herein as inducers. Thus, for example, when diphenyl acetylene is heated to a temperature between 260–280° C. in presence of a catalytic amount of iron tetracarbonyl, a reaction starts immediately with the formation of well defined crystals of hexaphenylbenzene.

In addition, it has been found that monosubstituted acetylenic compounds are more favorably trimerized into substituted benzenic compounds under the same conditions. Thus the process of the invention is also concerned with improvements over the prior art in that monosubstituted acetylenic compounds undergo, in presence of a full class of inducers, namely metal carbonyls and organometal-carbonyl-complexes and without the step of preliminary activation of said inducers, a one-step trimerization resulting in high yields. More generally, the present invention is concerned with the preparation of substituted benzenic compounds by using the properties of the acetylenic triple bond which, under hereinafter described conditions and in presence of said inducers, can undergo a direct cyclization.

The process of the present invention for the preparation of substituted aromatic compounds comprises the step of heating at least one substituted acetylenic compound at an elevated temperature in presence of an inducer selected from the class consisting of a metal carbonyl and a stable organo-metal-carbonyl-complex resulting from the reaction of an acetylenic compound with a metal carbonyl, said temperature being higher than the decomposition temperature of said inducer and being higher than the temperature corresponding to the decomposition of a stable complex resulting from the said substituted acetylenic compound and the said metal carbonyl.

As it is apparent from the foregoing, the above general process is not restricted to the heating of one mono- or disubstituted acetylenic compound wherein the substituents are identical or different. It also includes the heating in presence of said inducers of a plurality of compounds as a mixture, said mixture consisting of at least two acetylenic compounds regardless whether their substituents are identical or different. Thus the inventive process includes the heating of at least one mono- or disubstituted acetylenic compound with acetylene in presence of said inducers and under hereinafter described conditions.

The substituted acetylenic compounds which have been found useful in the inventive process have the general formula R'—C≡C—R", wherein R' is hydrogen atom and R" an alkyl, an aryl, an alkyl-aryl, a cycloaliphatic radical and derivatives thereof, or both R' and R" are identical or different alkyl, aryl, alkyl-aryl, cycloaliphatic radicals and derivatives thereof including substituents bearing —COH, —CN, -halogen, —$NR_2$, —COOR wherein R is an aliphatic or an aromatic radical.

These respective meanings are for the purpose of this disclosure to be understood to be applicable to any discussion herein of the substituted groups of the acetylenic compounds. Thus representative substituted acetylenic compounds include phenylacetylene, p. bromo-phenyl acetylene, diphenylacetylene, di(p. chloro phenyl) acetylene, diethyl acetylene, phenylmethyl-acetylene, dimethyl ester of acetylenic dicarboxylic acid, methyl phenylpropiolate.

The term "inducer" as used in this specification refers to a compound which when added in at least a small amount into the reaction system activates the triple bond of the said acetylenic compound. The thermally decomposed inducer is believed to yield unstable electron acceptors which readily attack the acetylenic linkage resulting at the reaction temperature in a transient unstable intermediate to the cyclization product. Suitable inducers for use in the present invention are thus those which by decomposition result in the liberation of electron acceptors such as metal carbonyls and the organo-metalcarbonyl complexes.

The said inducers are the transition metal carbonyls, namely those of iron, nickel, cobalt, ruthenium, rhodium, palladium, osmium, iridium, platinum, the mercury derivatives of iron and cobalt carbonyls, the carbonyls of manganese, rhenium, chromium, molybdenum and tungsten and the organo-metal-carbonyl complexes as defined in my co-pending application Serial No. 707,111, filed Jan. 6, 1958 and resulting from the reaction of an acetylenic compound with a metal carbonyl.

The preferred inducers are those which decompose the most readily with the liberation of electron acceptors, namely the carbonyls of iron and cobalt, and their mercury derivatives.

For the said inducers, it has been found that from about four to about fifteen percent by weight should be used. It is apparent that the minimum of said inducer compound is that amount which initiates the reaction.

The process of the invention is always carried out elevated temperature which is high enough to produce a well defined substituted aromatic compound in high yield. The temperature range is from about 50 to about 400° C.; the preferred reaction temperature within the range is determined by the usual parameters, that is nature of reactants, presence of solvents, reaction products. It is essential that the reaction temperature must be higher than the temperature at which the inducers decompose resulting in the liberation of said electron acceptors. The temperature of the reaction must also be higher than the temperature corresponding to the decomposition of a stable complex resulting from an acetylenic compound and a metal carbonyl, which have been fully disclosed in my aforesaid co-pending application. For example, heating 5 gr. of diphenylacetylene in presence of 10% of iron tetracarbonyl at a reaction temperature of 270° C. yields exclusively hexaphenylbenzene whereas at 90° C., the reaction gives substantial yield of stable organo-metal-carbonyl complexes such as $Fe_2(CO)_6(C_6H_5C_2C_6H_5)_2$ for instance. Since the said complex decomposes at higher temperature, e.g. 200° C., it is apparent that only cyclization takes place when the reaction is performed at a temperature, e.g.: 270° C., which is higher than the decomposition temperature of said complex.

The cyclization can be performed without addition of solvent when the acetylenic derivatives are liquid at the reaction temperature, as for example tolane. It is also advisable to perform the reaction in an inert atmosphere such as nitrogen for example which is a safety measure whenever carbonyls or similar compounds are used under heating.

The invention includes also a process of heating at least one substituted acetylenic compound and a small amount of an inducer in an organic solvent and separation of the the reaction product from the residue or from the solution or from both. It has been found that it is beneficial, in that higher yields are generally obtained and also the separation of the product is facilitated, to perform the reaction in at least one of the following solvents: dioxan, tetrahydrofuran, tetrahydropyran, mesitylene, 2.4.6. trimethylpyridine, di-n-amylether, decalin, 1.2.4.5.tetramethylbenzene, tetralin. It is clear that the choice of the appropriate solvent is dependent upon the temperature range at which the reaction is conducted and the respective solubilities of the reactants and the products. In presence of said solvents, the reaction temperature is lowered and it generally ranges from about 50° C. to about 200° C.

When the initial system consists in a plurality of acetylenic compounds, such as for instance two reactants, it has been found that the yield in the various reaction products is dependent upon whether the reactants are first mixed with the inducer and then heated at the reaction temperature or whether one recatant is first heated at the reaction temperature and then the second reactant plus the inducer are added at that temperature and by small fractions.

Although the mechanism of the reaction is not yet fully understood, it is believed that the reaction is initiated by the unstable electron acceptors formed by thermal decomposition of the inducer which readily attack the acetylenic linkage forming active groups $$R'-C=C-R'' \text{ or } R'-\overset{(+)}{C}=\overset{(-)}{C}-R''$$

Those groups in turn combine, perhaps after some type of orientation or rearrangement, into an aromatic ring. Regardless the possible mechanism of the reaction, the inventive process includes the thermal decomposition of the inducer providing the in situ opening of the acetylenic linkage without the formation of a stable organo-metal-carbonyl complex and the subsequent cyclization into an aromatic ring.

As it is apparent from the foregoing discussion, the products of the invention are substituted aromatic compounds the structure of which is dependent upon the nature of the substituting groups attached to the acetylenic radicals involved in the reaction. It is thus obvious that a large variety of partially and completely substituted aromatic compounds can be prepared by the inventive process. Cyclization of mono-substituted or disubstituted acetylenic compounds wherein the substituents are different leads normally to the formation of 1.2.4. asymmetric substituted aromatic compounds. A series of reaction products ranging from tri-, tetra-, penta to hexa-substituted aromatic compounds is obtained when the initial system contains at least two different substituted acetylenic reactants. This series is extended to also include mono- and di-substituted aromatic compounds as reaction products when a mono- or di-substituted acetylenic compound is reacted with acetylene in presence of said inducers and under the foregoing and related conditions. Thus the novel products of the invention include 1.2.4. tri(bromophenyl)benzene, hexa (p. chlorophenyl)benzene, 1.2.4. trimethyl 3.5.6. triphenyl benzene, 1.2. diethyl 3.4.5.6. tetraphenyl benzene, 1.2.3.4. tetraethyl 5.6. diphenyl benzene, 1.2. diphenyl 3.4.5.6. tetracarbomethoxy benzene, 1.2.4. triphenyl 3.5.6. tricarbomethoxy benzene, 1.2.3.4. tetraphenyl 5.6. dicarbomethoxy benzene, 1.2.3.5. tetraphenyl benzene.

The invention will be more readily understood by reference to the purely illustrative following examples describing the preparation of various substituted aromatic compounds according to the inventive process.

EXAMPLE I 0.200 gms. of iron tetracarbonyl are added to 5 gms. of diphenylacetylene (tolane) with mixing by agitation and the air is removed by replacement with nitrogen. The system is heated at once to a temperature between 260–280° C. by placing the reaction flask in a lead-tin bath. An exothermic reaction commences immediately with the almost instantaneous formation of well defined crystals of hexaphenylbenzene. The reaction is completed with a few minutes.

After cooling the unreacted tolane is eliminated by washing with methyl alcohol.

After purification by extraction with tetrahydrofuran or by recrystallization with α-methyl-naphthalene, the white crystals of hexaphenylbenzene $(C_6H_5)_6C_6$ have a melting point of 418–419° C., (not corrected). Hexaphenylbenzene is the only organic reaction product formed. The yield is found to be 70% and higher, based upon the initial amount of tolane used.

Analysis of this synthesized hexaphenylbenzene gives the following result:

|  | C, percent | H, percent |
| --- | --- | --- |
| Calculated | 94.34 | 5.65 |
| Found | 94.34 | 5.59 |
|  | 94.55 | 5.68 |

Results of similar reactions occurring with other inducers are summarized in the Table I set out below:

*Table I*

| Inducer used | Percent in weight | Reaction temperature in °C. | Yield of $(C_6H_5)_6C_6$ in percent |
|---|---|---|---|
| $[Fe(CO)_4]_3$ | 4 | 270–280 | 70–75 |
| $[Fe(CO)_4]_3$ | 8 | 270–280 | 75 |
| $Fe(CO)_4Hg$ | 8 | 280–290 | 50 |
| $Fe_2(CO)_6(\phi C_2\phi)_2$ | 4 | 270–280 | 50 |
| $Fe_2(CO)_6(\phi C_2\phi)_2$ | 8 | 270–280 | 62 |
| $Fe_3(CO)_8(\phi C_2\phi)_2$ | 4 | 260–280 | 50 |
| $[Co(CO)_4]_2$ | 4 | 260–280 | 65 |
| $[Co(CO)_4]_2Hg$ | 4 | 270 | 50 |
| $[Co(CO)_4]_2Hg$ | 8 | 270 | 75 |
| $Co_2(CO)_6(\phi C_2\phi)$ | 10 | 270 | 40 |
| $Mo(CO)_6$ | 10 | 270 | 50 |
| $[Mn(CO)_5]_2$ | 8 | 270 | 60 |

Where $\phi$ is the phenyl-radical.

EXAMPLE II

To 1 g. of diphenylacetylene, dissolved in 5 ml. of various organic solvents the list of which is given in Table II set out below, 10% of various inducers (see also Table II) were added and the mixture kept boiling under reflux for one hour.

During the reaction, hexaphenylbenzene is precipitated and is separable after cooling by filtration. The hexaphenylbenzene so obtained is purified, dried and weighed.

The yields in hexaphenylbenzene, expressed in percent, are given in Table II in regard of the various inducers and solvents used for the cyclization.

*Table II*

| Solvents | | Inducers | | | |
|---|---|---|---|---|---|
| Name | Boiling T (° C.) | $[Fe(CO)_4]_3$ | $Fe_2(CO)_9$ | $Fe(CO)_5$ | $[CO(CO)_4]_2$ Hg |
| Tetrahydrofuran | 56 | | | | 58 |
| Tetrahydropyran | 70 | | | | 50 |
| Dioxan | 102 | 0 | 0 | 0 | 76 |
| Mesitylene | 164 | 50 | 48 | 48 | 65 |
| 2.4.6.trimethyl benzene | 172 | 70 | 37 | 86 | |
| Di-n-amyl ether | 182 | 55 | 74 | 78 | |
| Decalin | 185 | 76 | 51 | 75 | |
| 1.2.4.5.tetramethyl benzene | 193 | 70 | 37 | 65 | |
| Tetralin | 206 | 40 | 46 | 60 | 60 |

EXAMPLE III

To 3 gr. of p.p' dichlorotolane, dissolved in 50 ml. of dioxan, 300 mgr. of $[Co(CO)_4]_2$ Hg were added and the mixture kept boiling under reflux for one hour.

During the reaction, the cyclization product crystallizes out and is easily separated after cooling by filtration. The yield of the crude product is found to be 97%.

After purification by recrystallization with tetrahydrofuran or by sublimation at 300° C. and at 15 mm. Hg, the white crystals are found to be hexa-(p. chlorophenyl)-benzene $(ClC_6H_4)_6C_6$ to the exclusion of any by-product.

Analysis of hexa-(p. chlorophenyl)-benzene (M.P. 405° C., not corrected), so obtained by trimerization, gives the following results:

| | C, Percent | H, Percent | Cl, Percent |
|---|---|---|---|
| Calculated | 68.04 | 3.26 | 28.70 |
| Found | 68.16 | 3.29 | 28.64 |
| | 68.02 | 3.19 | 28.47 |

EXAMPLE IV

A mixture of 11.3 gr. of the dimethyl ester of acetylene dicarboxylic acid and of 40 ml. of dioxan is heated under reflux. During this operation, 750 mgr. of Hg $[Co(CO)_4]_2$ dissolved in 5 ml. of dioxan, is added by small fractions into the previous mixture, which is afterwards kept boiling under reflux for one hour.

The excess of dioxan and of non-reacted ester are eliminated from the reaction product by distillation in vacuum. The crude product can be recrystallized in methanol or ethanol and gives white acicular crystals of the hexamethyl ester of the mellitic acid $(COOCH_3)_6C_6$. The melting point is 186° C. and the yield is found to be 60–70%.

EXAMPLE V 1 gr. of diethylacetylene dissolved in 5 ml. of dioxan is heated under reflux and 150 mg. of $[Co(CO)_4]_2$ Hg, dissolved in 5 ml. of dioxan, is added by small fractions into the solution. When all is added the reaction mixture is kept boiling under reflux for one hour.

After elimination of the non-reacted diethylacetylene and of the solvent by evaporation, the crude reaction product is recrystallized in petroleum ether and gives white crystals of hexaethylbenzene $(C_2H_5)_6C_6$. The melting point is 130° C. and the yield is about 75%.

EXAMPLE VI 150 mg. of $[Co(CO)_4]_2$ Hg are dissolved in 5 ml. dioxan and 1 gr. of phenylacetylene is then added. The reaction mixture is kept boiling under reflux during a period of one hour.

After elimination of the non-reacted phenylacetylene and of the solvent, the crude product is dissolved in benzene; it crystallizes out by addition of petroleum ether in white bipyramidal tetragonal crystals identified as 1.2.4. triphenylbenzene. The melting point of this compound is 120–121° C. and the yield is about 80%.

Analysis of the 1.2.4. triphenylbenzene gives the following results:

| | C, Percent | H, Percent | Mol. weight |
|---|---|---|---|
| Calculated | 94.08 | 5.92 | 306 |
| Found | 93.90 | 5.85 | 299 |
| | 93.99 | 5.87 | |

EXAMPLE VII 9.3 gr. (10 ml.) of phenyl-methyl acetylene dissolved in 50 ml. of dioxan is heated under reflux. During this operation, 1.2 gr. of $[Co(CO)_4]_2$ Hg, dissolved in 50 ml. of dioxan, is added by small fractions into the reaction mixture, which is afterwards kept boiling under reflux for one hour. The yield in crude product is found to be higher than 90%. After recrystallization, the formed 1.2.4. trimethyl 3.5.6. triphenyl benzene has a melting point of 227° C. The molecular weight was found to be 345–346 (calculated: 348).

The reaction also leads to a small fraction of a second reaction product (about 5%). It is believed that this compound is the symmetric 1.3.5. trimethyl 2.4.6. triphenylbenzene (M.P.: 317° C.)

EXAMPLE VIII 1 gr. of methyl phenylpropiolate dissolved in 5 ml. of dioxan is heated under reflux. During this heating, 150 mgr. of $[Co(CO)_4]_2$ Hg, dissolved in 5 ml. of dioxan, is added by small fractions into the reaction mixture which is afterwards kept boiling under reflux for one hour.

The non-reacted phenylpropiolicmethylester and the solvent are eliminated by evaporation. The crude product is recrystallized in benzene by addition of ether and gives white crystals of a novel compound, identified as 1.2.4. triphenyl 3.5.6 tricarbomethoxybenzene. The melting point is 204–206° C. and the yield is about 50%.

Analysis of this novel compound gives the following results:

|  | C, percent | H, percent |
|---|---|---|
| Calculated | 75.06 | 5.04 |
| Found | 75.01 | 4.90 |
|  | 75.07 | 5.02 |

EXAMPLE IX

The trimerization of a mixture consisting of tolane and of diethylacetylene in presence of $[Co(CO)_4]_2$ Hg was conducted according to two different processes, referred to as processes A and B.

A. 10 gr. of tolane, dissolved in 50 ml. of dioxan, is heated under reflux for one hour; during this period, 5 gr. of diethylacetylene and 2.25 gr. of $[Co(CO)_4]_2$ Hg dissolved in 25 ml. of dioxan are added separately and by small fractions into the previous mixture which is afterwards kept boiling under reflux for one hour.

The precipitated crystals are after cooling separated out by filtration and are identified as a mixture consisting of hexaphenylbenzene and a novel compound referred to as fraction ii. After evaporation of the non-reacted diethylacetylene and of the solvent, the residue is dissolved in benzene, filtered and separated out by chromatography, giving the novel compounds referred to as fraction ii and fraction iii.

B. The second process is identical to the first one except that, in this case, a mixture consisting of 10 gr. of tolane, dissolved in 50 ml. of dioxan, and of 2.25 gr. of $[Co(CO)_4]_2$ Hg, is added the 5 gr. of diethylacetylene dissolved into 25 ml. of dioxan.

The results of both processes A and B were as follows:

Table 3

| Reaction products | Process A | Process B |
|---|---|---|
| i. Hexaphenylbenzene, gr | 1.5 | 1.2 |
| ii. 1.2 diethyl 3.4.5.6. tetraphenylbenzene, gr | 7.3 | 7.1 |
| iii. 1.2.3.4. tetraethyl 5.6. diphenylbenzene, gr | 3.8 | 4.2 |
| iv. Hexaethylbenzene | 0 | 0 |
| Total yield, percent | >80 | >80 |

Analysis of the novel products gave the following results:

[ii. 1.2 diethyl 3.4.5.6. tetraphenylbenzene (M.P. 249–250° C.)]

|  | C, percent | H, percent |
|---|---|---|
| Calculated | 93.10 | 6.90 |
| Found | 93.23 | 7.07 |

[iii. 1.2.3.4. tetraethyl 5.6 diphenylbenzene (M.P. 131° C.)]

|  | C, percent | H. percent |
|---|---|---|
| Calculated | 91.16 | 8.84 |
| Found | 91.29 | 8.62 |

EXAMPLE X

The cyclization of a mixture of tolane and dimethylester of acetylenic carboxylic acid in presence of $[Co(CO)_4]_2$ Hg was conducted according to four different processes thereinafter described under A, B, C and D.

A. A solution of 7 gr. of dimethylester, of 1.8 gr. of tolane and of 0.740 gr. $[Co(CO)_4]_2$ Hg in 35 ml. of dioxan is heated under reflux for one hour.

After elimination of the non-reacted dimethylester and of the solvent, the residue is dissolved in benzene and separated out in 2 fractions by chromatography giving a fraction ii and hexamethylester of metallitic acid and non reacted tolane.

B. A solution of 1.5 gr. of dimethylester, of 9 gr. of tolane, and of 1.03 gr. of $[Co(CO)_4]_2$ Hg in 50 ml. dioxan is heated under reflux for one hour.

The hexaphenylbenzene which crystallizes out on cooling is separated out by filtration, and the hexamethylester of mellitic acid is separated out by chromatography.

C. 5 gr. of tolane is dissolved in 25 ml.. of dioxan and heated under reflux for one hour. During this period, 5 gr. dimethylester and 1.5 gr. $Hg[Co(CO)_4]_2$ dissolved in 25 ml. dioxan are added by small fractions to the reaction mixture which is, afterwards, kept boiling under reflux for one hour.

The three following fractions are separated out by chromatography: two novel reaction products referred to as ii and iii and the hexamethylester of mellitic acid.

D. 5 gr. of dimethylester is dissolved in 25 ml. dioxan and heated under reflux for one hour. During this period, 5 gr. of tolane and 1.5 gr. $[Co(CO)_4]_2$ Hg in 25 ml. dioxan are added by small fractions to the reaction mixture which is afterwards kept boiling under reflux for one hour.

Separation by chromatography gives the two following fractions: the novel product ii and the hexamethylester of mellitic acid.

The results obtained by the foregoing and related processes are given in the table set out below.

Table 4

| Reaction product | Process A, gr | Process B, gr | Process C, gr | Process D, gr |
|---|---|---|---|---|
| i. Hexaphenylbenzene | | 5.1 | | |
| ii. 1.2 diphenyl 3.4.5.6. tetracarbomethoxy benzene (M.P. 218° C) | 1.3 | | 1 | 0.25 |
| iii. 1.2.3.4. tetraphenyl 5.6. dicarbomethoxy benzene (M.P. 264° C) | | | 0.7 | |
| iv. Hexamethylester of mellitic acid | 3.2 | 0.3 | 0.6 | 3.2 |

EXAMPLE XI

The trimerisation of a mixture consisting of tolane and phenylacetylene in presence of $[Co(CO)_4]_2$ Hg was conducted according to three different processes referred to as processes A, B and C.

A. A solution of 1 gr. phenylacetylene, 3.6 gr. tolane and 750 mgr. $[Co(CO)_4]_2$ Hg in 25 ml. dioxan is heated under reflux for one hour.

The hexaphenylbenzene which crystallises out on cooling is separated out by filtration. From the filtrate, two compounds referred to as fractions ii and iii are separated out by fractional crystallisation.

B. A solution of 3 gr. phenylacetylene 2.6 gr. tolane and 855 mgr. $[Co(CO)_4]_2$ Hg in 25 ml. dioxan is heated under reflux for one hour. The hexaphenylbenzene which crystallises out on cooling is separated out by fractional crystallisation.

C. 5 gr. of phenylacetylene is dissolved in 20 ml. dioxan and heated under reflux for one hour. During this period 8.9 gr. tolane and 2.1 gr. $[Co(CO)_4]_2$ Hg dissolved in 50 ml. dioxan are added by small fractions to the reaction mixture which is afterwards kept boiling under reflux for one hour.

The hexaphenylbenzene which crystallises out on cooling is separated out by filtration. From the filtrate, the compounds referred to as ii and iii fractions as well as the 1.2.4. triphenylbenzene are separated out by chromatography.

The results obtained by the foregoing and related processes are given in the table set out below.

Table 5

| Reaction product | Process A, gr | Process B, gr | Process C, gr |
|---|---|---|---|
| i. Hexaphenylbenzene | 2.3 | 0.480 | 6.18 |
| ii. 1.2.3.5. tetraphenylbenzene | 0.15 | 1 | 1.5 |
| iii. 1.2.3.4.5. pentaphenylbenzene | (¹) | (¹) | 1 |
| iv. 1.2.4. trophenylbenzene | | | 1.5 |

¹ Traces.

The novel product described under ii, which has a melting point of 224° C., is believed to be the 1.2.3.5. tetraphenylbenzene.

Infra-red spectroscopy of the fraction iii shows that this novel compound is the 1.2.3.4.5. pentaphenylbenzene.

The compounds prepared in a one-step operation according to the inventive process are substituted aromatic compounds some of which, otherwise, could only be prepared with considerable difficulties. It is noteworthy that the aromatic compounds, such as those bearing substituents in 1.2.4. position or 1.2.3.5. position, resulting from the inventive process are compounds which are normally never isolated in usual synthesis. It is apparent that the said substituted aromatic compounds can be used as starting materials in further synthesis leading to a large variety of aromatic derivatives.

A general use of the inventive products having aromatic substituents in their structure is as starting material for the building of large ring systems. For instance, heating of hexaphenylbenzene or hexa(p.chloro-phenyl)benzene in presence of $AlCl_3$ yield highly condensed polycyclic compounds. Another use for substituted aromatic compounds bearing halogens in their structure, such as 1.2.4. tribromophenylbenzene for instance, is the preparation of hexylbenzenes which are readily obtainable by hydrogenation under pressure.

Substituted aromatic compounds having alkyl substituents in their structure can be involved in many reactions. For instance, the carbomethoxybenzenic compounds can be transformed into the corresponding phthalyl derivatives which are known to be extensively used as reactants in the Friedel and Crafts synthesis. It is apparent that alkyl chains can easily be carboxylated under oxydizing conditions. By nitration, one obtains nitro-compounds which can further be used in the preparation of dyes and related material.

I claim:
1. A process for the preparation of substituted aromatic compounds which comprises heating at an elevated temperature at least one acetylenic compound selected from the group consisting of R'—C≡C—R" and R—C≡C—H, wherein R, R' and R" represent members selected from the groups consisting of lower alkyl, phenyl, lower alkyl-phenyl, and the carboxyl, cyano, halogeno, and carbo- lower alkoxy substituted derivatives thereof; in the presence of an inducer selected from the class consisting of a transition metal carbonyl consisting of at least one carbonyl group and at least one metal selected from the group consisting of iron, nickel, cobalt, ruthenium, rhodium, palladium, osmium, iridium, platinum, manganese, rhenium, chromium, molybdenum, and tungsten, the mercury derivatives of metal carbonyls consisting of at least one carbonyl group and a metal selected from the group consisting of iron and cobalt, and a stable organo-metal carbonyl complex resulting from the reaction of an acetylenic compound with a transition metal carbonyl; said elevated temperature being higher than the decomposition temperature of said inducer and of the order of from about 50° C. to about 300° C.

2. A process according to claim 1, wherein the reaction temperature is from about 50° C. to about 200° C. and said reaction is performed in an organic solvent selected from the group consisting of dioxan, tetrahydrofuran, tetrahydropyran, mesitylene, 2.4.6.trimethylpyridine,di-n-amylether, decalin, 1.2.4.5.tetramethylbenzene, and tetralin.

3. A process according to claim 1, wherein the said inducer is an organo-metal-carbonyl complex resulting from the reaction of an acetylenic compound and a metal carbonyl.

4. A process as claimed in claim 1, in which the inducer is iron carbonyl.

5. A process as claimed in claim 1, in which the inducer is cobalt carbonyl.

6. A process as claimed in claim 1, in which the inducer is the complex, $Fe(CO)_4Hg$.

7. A process as claimed in claim 1, in which the inducer is the complex, $[Co(CO)_4]_2Hg$.

8. A process as claimed in claim 1, in which the acetylenic compound is diphenylacetylene.

9. A process as claimed in claim 1, in which the acetylenic compound is the dimethyl ester of acetylene dicarboxylic acid.

10. A process as claimed in claim 1, in which the acetylenic compound is diethylacetylene.

11. A process as claimed in claim 1, in which the acetylenic compound is methyl phenylpropiolate.

References Cited in the file of this patent

UNITED STATES PATENTS 2,819,325    Lanning et al.           Jan. 7, 1958

FOREIGN PATENTS 631,854    Germany               July 4, 1936

OTHER REFERENCES

Beilstein, 9, 989 (1926).
Beilstein, 5, 737, 755 (1922); 370 (1930).
Dilthey et al.: Ber. Deut. Chem., volume 67, 1959–64 (1934).
Reppe et al.: Ann., 560, 104, 105, 110 (1948).